July 5, 1966 H. I. OSHRY 3,259,836
INDUCTION LOGGING APPARATUS HAVING PLURAL RECEIVER COILS EACH
FORMING A MUTUALLY BALANCED SYSTEM WITH THE TRANSMITTER COILS
Filed Jan. 19, 1962 2 Sheets-Sheet 1
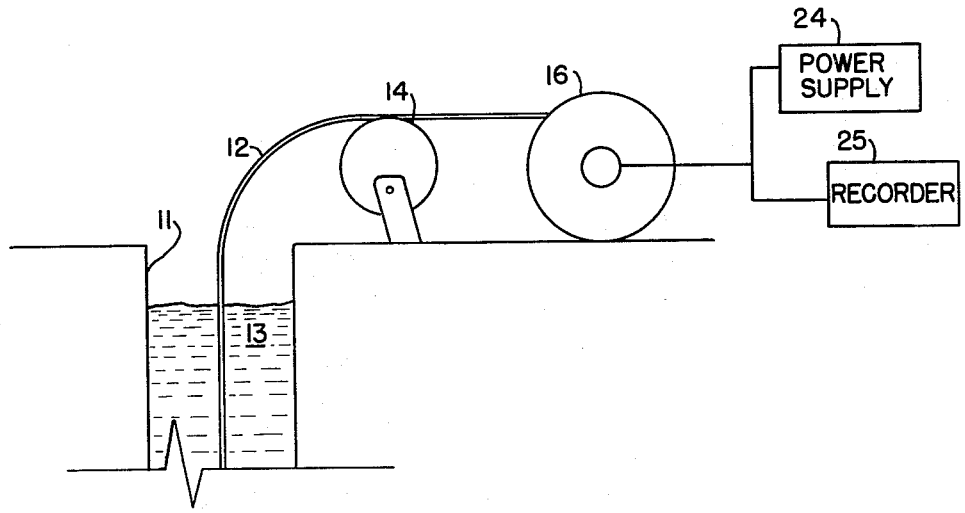
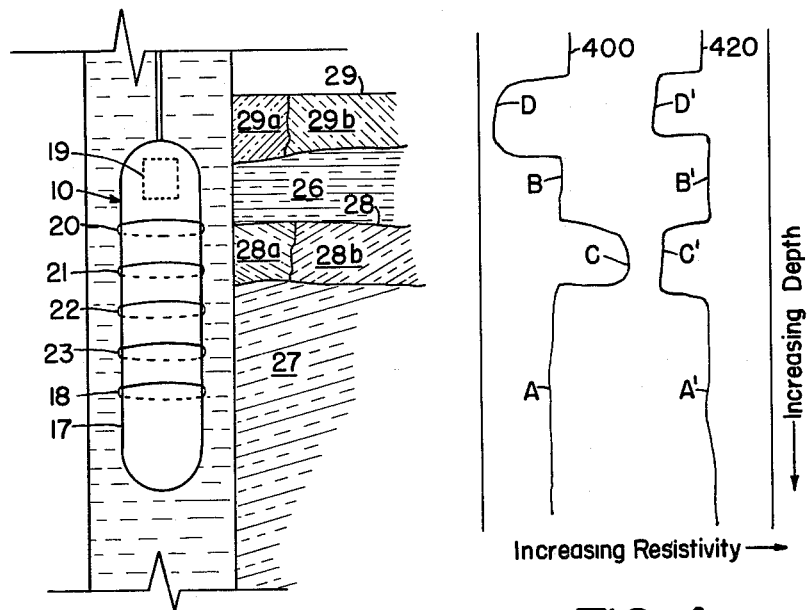
FIG.1
FIG.4
INVENTOR.
HOWARD I. OSHRY
BY
Robert W. Mayer
HIS ATTORNEY United States Patent Office 3,259,836
Patented July 5, 1966

3,259,836
INDUCTION LOGGING APPARATUS HAVING PLURAL RECEIVER COILS EACH FORMING A MUTUALLY BALANCED SYSTEM WITH THE TRANSMITTER COILS
Howard I. Oshry, Houston, Tex., assignor to Dresser Industries, Inc., Dallas, Tex., a corporation of Delaware
Filed Jan. 19, 1962, Ser. No. 167,311
3 Claims. (Cl. 324—6)

This invention relates to apparatus for investigating earth formations traversed by a borehole by measuring the resistivity of such formations to alternating currents electromagnetically induced therein and, more particularly, to apparatus for simultaneously measuring the resistivity of such formations at different radial distances from the well bore.

Significant information regarding the nature of earth formations traversed by well bores can be obtained by the technique known as induction logging. This technique is generally described in U.S. Patents 2,220,070 to Charles B. Aiken and 2,220,788 to Ralph W. Lohman as well as more recently in U.S. Patents 2,582,314 and 2,582,315 to Henri-Georges Doll. The latter two patents describe apparatus responsive primarily to the condition of earth formations located a specified distance from the borehole. Such apparatus provides signals relatively uninfluenced by the resistivity of material close to the logging tool, such as drilling fluid filling the borehole, and thus gives more accurate indications of the character of the traversed earth formations.

A significant disadvantage of prior art induction logging tools built in accordance with the principles disclosed in the aforesaid patents is inseparable from the very advantage they provided. For a given coil system the radial (with respect to the well bore) sensitivity is fixed so that for a given tool, devised, for example, to provide a signal influenced substantially only by the resistivity of formations a substantial distance beyond the well bore, significant changes in resistivity of the medium lying closer than the selected distance are not detected. It is frequently desirable, however, to detect both such resistivity changes, preferably simultaneously. For example, in a stratum that has previously been determined to be of fairly high porosity, by means of some correlation log, the detection of a highly conductive region a short distance beyond the well bore in conjunction with a highly resistive region at the same vertical depth but located a greater distance beyond the well bore is indicative of the presence of oil or gas. This is particularly true where highly conductive drilling fluid is used. Using prior art induction logging tools, information of this kind can be obtained only by the running of two separate induction logs. In addition to being both time consuming and expensive, this procedure is also unsatisfactory because it may not always be possible to obtain exact depth correlation between two logs run at separate times and because the extent of invasion of particular porous formations by drilling fluid may change between the times the two logs are run.

An object of this invention is to provide an induction logging tool providing formation resistivity measurements useful in the qualitative interpretation of such formations, i.e., differentiation between water-bearing and oil-bearing formations.

Another object is to provide an induction logging tool providing formation resistivity measurements useful in the quantitative interpretation of such invaded and uninvaded zones at the same depth.

Another object is to provide an induction logging tool which simultaneously makes two induction curves each of which is made up of a signal principally responsive to earth formations located at different radial distances from the tool.

The foregoing objects are accomplished, in general, by means of an induction logging tool containing two mutually balanced coil systems, each system sharing the same pair of transmitter coils. The transmitter coils are electrically connected in series opposition and actuated by a common source. The receiver coils are electrically independent of one another and each is connected to a separate recording element for indicating the magnitude of voltage signals induced therein. The number of windings and relative position of one of the receiver coils with respect to the transmitter coils is so chosen as to constitute a substantially mutually balanced coil system principally responsive to the resistivity of a medium spaced a predetermined distance therefrom. The second receiver coil contains a predetermined number of turns and, by its position with respect to the transmitter coils, forms a separate substantially mutually balanced system with them which is principally influenced by a medium a different distance therefrom. The operation of this system within an earth well borehole produces a log composed of two independent depth correlated conductivity or resistivity curves. By choosing appropriate coil turns and spacings, one of such curves may be made principally responsive to what would normally be the zone closest the well bore and invaded by drilling fluid, while the other could be made responsive to a medium beyond such fluid invasion depth and independent of the condition of the invaded zone. The response characteristics of both systems are preferably chosen to be substantially insensitive to changes in the electrical characteristics of material lying relatively close to the axis of the coil systems so that the effect of fluid in the borehole is negligible.

In the accompanying drawings:

FIG. 1 illustrates schematically the arrangement of an induction logging tool within a well bore and connected to appropriate surface equipment;

FIG. 4 illustrates a portion of a typical depth versus resistivity log made in accordance with this invention.

Figure 2:
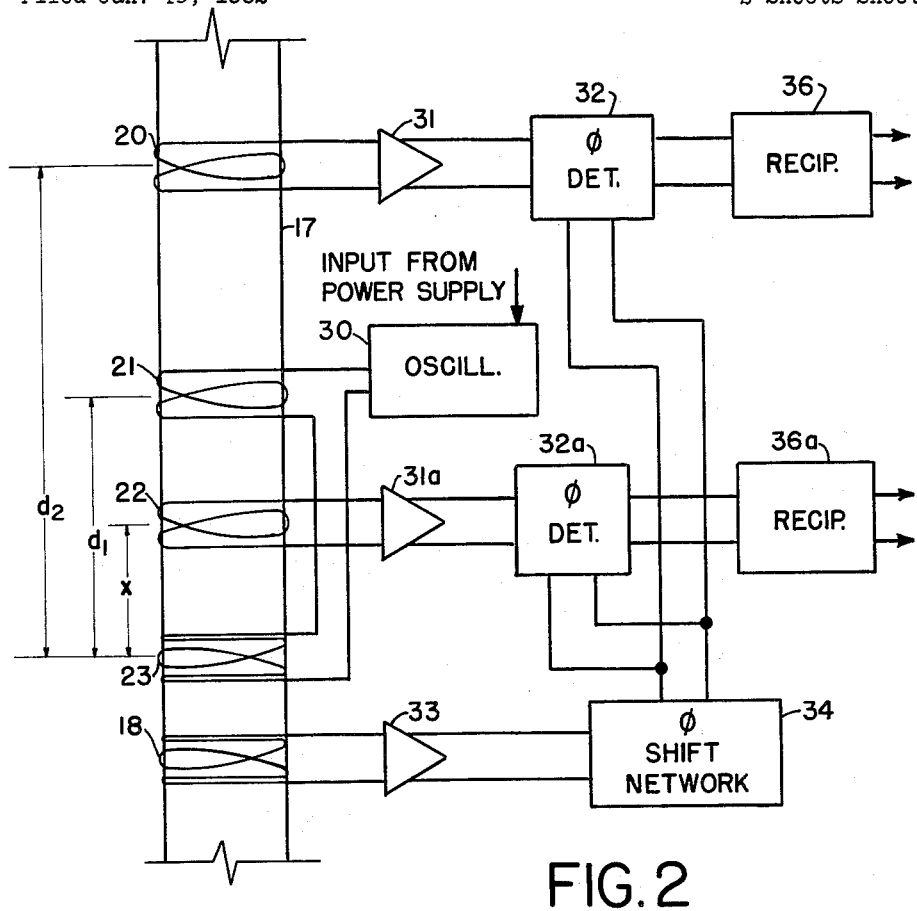
FIG. 2 is a schematic diagram of an induction logging system constructed according to this invention.

The apparatus illustrated in FIG. 1 includes a logging tool 10, suspended in a borehole 11 on a cable 12 extending to the surface of the earth. The borehole 11 may contain a liquid 13 which may be more or less (but usually is more) conductive than the surrounding earth. Cable 12 passes over a pulley 14 by means of a suitable winch 16 by means of which it may be raised or lowered in the borehole 11.

The logging tool 10 includes an elongated, generally cylindrical, hollow, non-conductive, mandrel 17 upon which are wound receiver coil 20, transmitter coil 21, receiver coil 22, transmitter coil 23 and reference coil 18. Contained within the mandrel is the cartridge 19 which contains various electronic circuits which will be identified subsequently but which form no part, per se, of this invention. The cartridge contains, among other things, a suitable oscillator for supplying, for example, 20 kilocycle alternating current and which is energized by the surface power supply 24 through conductors (not shown) in the cable 12. The respective output signals of the cartridge 19 are transmitted through other conductors (not shown) in the cable 12 to recording means 25 which make a pair of automatic records each of which is a function of one of the output signals from the cartridge 19 as will be described in detail subsequently.

In FIG. 1, for purposes of illustrating one particular application of this invention, the borehole 11 is shown as traversing relatively fluid-impervious formations 26 and 27, between which lies a porous oil-bearing formation 28, with the well fluid 13 having invaded the portion 28a adjacent the well bore and displaced the oil to the more distant portion 28b. A porous saltwater-bearing formation 29 is shown above formation 26 and includes invaded portion 29a and uninvaded portion 29b.

FIG. 2 shows the relative positioning of the various coils of the two systems on the mandrel 17. The array illustrated is made up of two mutually balanced three-coil systems. The first system, is made up of transmitter coils 21 and 23 and receiver coil 22, while the other is made up of the same transmitter coils 21 and 23 and the receiver coil 20. Transmitter coils 21 and 23 are serially connected and oppositely wound. They are electrically connected to circuit means including oscillator 30 which is contained in cartridge 19 of FIG. 1 as are the various other electronic circuits and components illustrated in block diagram form in FIG. 2. The spacing of the receiver coil 20 and the transmitter coils 21 and 23 and the numbers of windings on the transmitter coils are such as to form a substantially mutually balanced system in a non-conductive medium. By this it is meant that the sum of the voltages mutually induced in the receiver 20 by the transmitter coils 21 and 23 when they are actuated by the oscillator 30 is substantially zero. For such condition, it has been found that where $T_{21}$ equals the number of turns in coil 21, $T_{23}$ equals the number of turns in coil 23, $d_2$ equals the distance between transmitter coil 23 and receiver coil 20 and $d_1$ equals the distance between the transmitter coil 23 and the transmitter coil 21, the condition of mutual balance is satisfied when $$\frac{T_{23}}{d_2^3} = \frac{T_{21}}{(d_2-d_1)^3}$$

Figure 3:
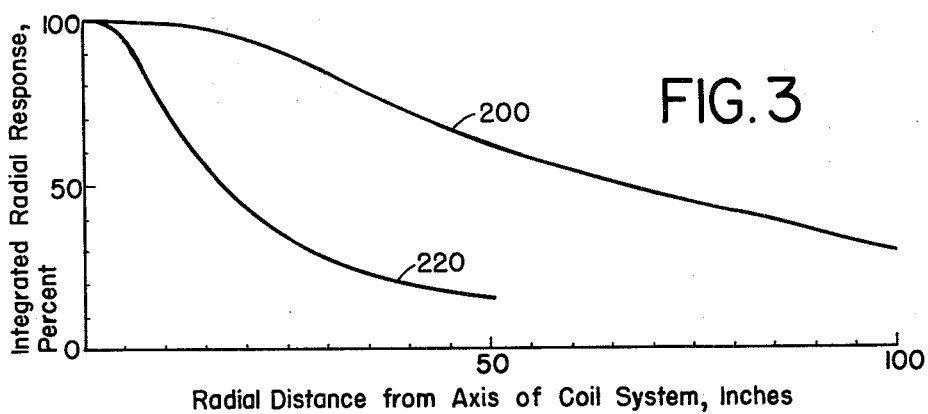
FIG. 3 is a graph illustrating typical radial response curves for the two induction logging systems depicted in FIG. 2.

Under these conditions, the signal induced in the receiver coil 20 is a measure of the formation conductivity with an integrated radial response curve indicated at 200 in FIG. 3.

In accordance with this invention, a second mutually balanced, induction logging coil system is formed with a second receiver coil 22 between transmitter coils 21 and 23. If X be the distance between receiver 22 and transmitter 23, the condition of mutual balance is obtained by satisfying the equation $$\frac{T_{23}}{X^3} = \frac{T_{21}}{(d_1-X)^3}$$

Under these conditions, the signal induced in the receiver coil 22 is a measure of the formation conductivity with a radial response curve indicated at 220 in FIG. 3. The significance of curves 200 and 220 will be explained in a subsequent portion of this specification.

Receiver coils 20 and 22 (FIG. 2) are each connected separately to suitable amplifiers 31 and 31a respectively, the outputs of which form one input to phase detectors 32 and 32a respectively. The other input of phase detectors 32 and 32a comes from reference coil 18. Reference coil 18 is inductively coupled to transmitter coil 23, being closely spaced therefrom, so that the voltage signal appearing as the output from reference coil 18 is 90° out of phase with the current in transmitter coil 23. This signal from coil 18 is amplified by amplifier 33 and shifted 90° by phase shifting network 34, the output of which forms one input of each of the phase detectors 32 and 32a. The reference signal to the phase detectors may, of course, be provided in other ways which are well known to those skilled in the art and which do not necessarily involve the use of a reference coil. It is necessary only that the reference input to the phase detectors have a voltage bearing a predetermined relation (not necessarily that of corresponding phase) to the current in transmitter coils 21 and 23. The particular type of phase detectors most conveniently employed depends on the relation between the reference voltage and the transmitter current.

Each of the phase detectors 32 and 32a comprises two triode vacuum tubes so arranged to be driven in push-pull by the output of the amplifier 31 (signal) and in parallel by the output of phase shifting network 34 (reference). A suitable circuit for phase detector 32 is disclosed in FIG. 14.14 appearing on page 514 of volume 19 of the MIT Radiation Laboratory Series, published by The Technology Press in 1949.

The outputs of phase detectors 32 and 32a are coupled as inputs to reciprocators 36 and 36a, respectively, which are made up of electronic or electro-mechanical means for converting input signals to output signals which are the reciprocals thereof. One suitable electro-mechanical arrangement for reciprocators 36 and 36a is that disclosed in U.S. Patent 2,726,365 to Kenneth A. Bilderback, issued December 5, 1955.

The outputs of reciprocators 36 and 36a are transmitted by means of conductors (not shown) in the cable 12 (FIG. 1) to the recorder 24 at the surface of the earth. Recorder 24 is of the dual pen variety for separately recording the output of reciprocator 36 connected to receiver coil 20 and that of reciprocator 36a connected to receiver coil 22. Receiver coil 20, reciprocator 36 and the elements of recorder 24 which control the pen indicating the voltage induced in coil 20 comprise one independent circuit means while receiver coil 22, reciprocator 36a and the elements of recorder 24 which control the pen indicating the voltage induced in coil 22 comprise another independent circuit means. Dual pen recorders for simultaneously indicating two different signals in correlation with depth are well known to those skilled in the well logging art. Such recorders are described in, for example, the specification of U.S. Patent 2,775,503 to Glen Peterson, issued December 25, 1956.

In a typical embodiment of this invention, the numbers of turns and coil spacings of the various coils shown wound on mandrel 17 are as follows:

$T_{21}$ ---- 100
$T_{23}$ ---- 21
X ---- inches -- 7½
$d_1$ ---- do ---- 20
$d_2$ ---- do ---- 50

The numbers of turns on the receiver coils 20 and 22 are immaterial as is the number of turns on reference coil 18. In a typical example, however, the numbers of turns are 100, 100 and 2 respectively.

The terms "balanced system," "mutually balanced system" and the like as used in this specification and the appended claims are intended to include not only those coil arrangements where the numbers of turns and coil spacings precisely satisfy the foregoing equations but also those deviating from these equations by only small values, for example, in the order of 10%. Such deviations are sometimes required to obtain the particular combination of investigation depths with convenient coil spacings in view of the fact that the number of turns for each coil is necessarily a whole number. Also, it is sometimes desirable to depart slightly from precise mathematical balance to achieve certain desirable focusing effects.

The operation of the invention is as follows:

Let is be assumed that the logging tool 10 is positioned within the well bore 11 as shown in FIG. 1 and that a logging operation takes place with the tool being raised toward the surface of the earth. Oscillator 30 supplies 20 kilocycles per second alternating current to the transmitter coils 21 and 23. This current induces a magnetic field in the formations surrounding logging tool 10 such as 26, 27, 28 and 29 in FIG. 1. This magnetic field, in turn, induces voltages within the formation which cause eddy currents to flow and it is the resistivity of the formation to these eddy currents which is measured. These eddy currents set up their own magnetic field to which receiver coil 20 is responsive. Accordingly, alternating voltage is generated in receiver coil 20 which would be 90° out of phase with the voltage in the formation if the formation were a purely resistive component and 180° out of phase with the voltage in transmitter coils 21 and 23. The voltage induced in receiver coil 20 is amplified by amplifier 31 and transmitted as signal input to phase detector 32. The voltage induced in reference coil 18 by transformer action of transmitter coil 23 is 90° out of phase with the voltage in coil 23 and is amplified by amplifier 33, shifted another 90° by phase shifting network 34 so that it is now 180° out of phase with the voltage in transmitter coils 21 and 23, and supplied as reference input to phase detector 32. As previously explained, phase detector 32 comprises two triode vacuum tubes arranged to be driven in push-pull by the signal voltage from amplifier 31 and in parallel by the reference voltage from phase shifting network 34. The resulting output signal from phase detector 32 is that component of the voltage induced in coil 20 which is in phase with the reference input.

The magnitude of the in phase component of the voltage in coil 20 is a function of the formation current which, in turn, is the product of the formation voltage and formation conductivity. Since the formation voltage is a function only of the peak value and frequency of the exciting current in coils 21 and 23 and since these values are maintained constant, it follows that formation current and, hence, the in phase component of the voltage induced in receiver coil 20 is directly proportional to formation conductivity. The input to reciprocator 36 is therefore a direct function of formation conductivity and the output thereof, being the reciprocal of the input, is a direct function of formation resistivity. This is recorded in correlation with the depth of the tool 10 in the well as the curve 400 on FIG. 4.

At the same time a voltage signal is induced in receiver coil 20 another voltage signal is induced in receiver coil 22, amplified by an amplifier 31a and compared with the reference voltage in phase detector 32. The output of amplifier 31a is converted to a resistivity signal by reciprocator 36a which is identical in operation with reciprocator 36. The output of reciprocator 36a is indicated on the curve 420 of FIG. 4 and measures the resistivity primarily from a different region than that measured by curve 400.

FIG. 3 is a graph in which the abscissae represent the radial distance in inches from the axis of the borehole 11 (or from the axis of the coils system on mandrel 17, since the borehole and the coil system are substantially coaxial) and ordinates represent integrated radial geometric factor in percentage. The term "radial" as used in the specification and claims refers to distance from the axis of the coil system along a radius of a circular cross section of the cylindrical borehole 11. "Integrated radial geometric factor" means the percentage of response for a given receiver coil which is caused by material located further than a particular radial distance from the axis of the coil. The curve 200 and 220 on FIG. 3 represent the response curves from the receiver coils 20 and 22 respectively. Both curves originate at 100% on the vertical axis indicating, obviously, that all of the response for each is influenced by material lying more than zero radial distance from the axis of the coil system. The curve 200 indicates that about 50% of the response of coil 20 is due to the current in formation lying more than 65 inches on a radial line from the axis of the coil, while curve 220 indicates that about 50% of the response of coil 22 is due to material located further than 15 inches from the axis of such coil. Both curves 200 and 220 will asymptotically approach the horizontal axis of FIG. 3 if further extended. For all practical purposes relating to well logging, coil 20 is influenced only by formations closer than about 100 inches from the coil axis with most of the influence coming from formations at least about 65 inches away. Similarly, coil 22 is influenced only by formations closer than about 25 inches with most of the influence coming from formations at least about 15 inches away. It is evident, therefore, that signals induced in coil 20 are indicative of the condition of formations relatively far from the borehole while those induced in coil 22 are indicative of the condition of formations closer to the borehole. Both coil systems are relatively insensitive to changes in electrical characteristics of material lying close enough to their axes to be included in the borehole. This is evident from the substantially horizontal course of curves 200 and 220 immediately adjacent the vertical axis of FIG. 3. For this reason, the detected signals are substantially independent of the contents of the borehole.

In the specific embodiment described coil 22 is influenced principally by the material lying at a radial distance such as to include the invaded region 28a of FIG. 1, while coil 20 is influenced principally by the uncontaminated region 28b lying a greater radial distance therefrom. Curve 400 of FIG. 4 is, therefore, a graph of resistivity against depth for formations including region 28b while curve 420 is a similar plot for regions lying the same radial distance from the axis of borehole 11 as 28a. Thus, when a series of strata such as illustrated in FIG. 1 is logged both curves 400 and 420 are relatively constant in the portions A, A', B and B' illustrating, respectively, the fluid impervious regions 27 and 26 at the radial distances characteristic of curves 400 and 420. In the region C of curve 400 and C' of curve 420 substantial excursions are seen to occur. On curve 420, which is responsive to the resistivity of material lying relatively close to borehole 11 such as 28a the excursion C' showing a marked decrease in resistivity is due to the invasion of region 28a by the borehole fluid 13. Since the borehole fluid is somewhat saline, it is more conductive than formation 27, hence the resistivity decrease indicated by excursion C'. If the formation 28 be oil bearing, substantially all the oil in region 28a will be displaced therefrom by the conductive borehole fluid 13. Region 28b beyond the limit of borehole fluid invasion is a region of relatively high resistivity as indicated on curve 400 by the excursion C. This is due to the presence of the non-conductive oil within the pores of formation 28.

As the tool 10 is raised through the borehole 11 through the relatively impervious formation 26, it passes opposite the porous saltwater filled formation 29. In most cases, this saltwater is more saline and so more conductive than drilling fluid 13. Since this formation is porous, drilling fluid 13 will invade a zone 29a which is a zone influencing curve 420 producing excursion D'. This excursion is similar to excursion C' in that it indicates the presence of relatively conductive saline fluid in the region 29a thus indicating the presence of interstices and of a relatively high porosity strata.

Curve 400 which is responsive to the more remote region 29b lying beyond the invaded zone shows an excursion D corresponding to the depth of this stratum. Excursion D is of somewhat greater magnitude than excursion D' because the saltwater is more saline than drilling fluid 13. The extent and direction of excursion D' indicates that the fluid in porous stratum 29 is relatively conductive saltwater rather than non-conductive oil or gas.

It can be readily appreciated that the provision of both curves 400 and 420 on the same logs permits differentiation between the oil bearing formation 28 and the saltwater bearing formation 29. If only curve 400 were available, excursion C and D might be interpreted as indicating impervious formation of different resistivities. Using prior art techniques, the unequivocal differentiation between oil bearing formations and deeply invaded water zones requires three suitably chosen resistivity logs (see "Suggestions for Better Log Combinations and Improved Interpretations" by H. G. Doll, J. L. Dumanoir and Maurice Martin, Volume 25, Geophysics, pages 854 to 882 at page 855). Because the present invention provides two independent resistivity curves, it is the equivalent of two separate resistivity logs so that it can be employed in conjunction with only one other resistivity log (or other suitable porosity log) to make the unequivocal differentiation between water sands and oil sands. Means for making a conventional resistivity log can be added to the induction logging tool of this invention so that all three logs can be made on a single pass through the well.

It can also be readily appreciated that since the present invention provides a measure of resistivity of the invaded zone close to the wall of borehole 11 where flushing has been maximum two of the most fundamental formation parameters, i.e., $R_{xo}$, the resistivity of the invaded zone and the true resistivity $R_t$ of the uncontaminated zone can be determined from a single log. These values are among the most important parameters needed in the evaluation of fluid saturation of porous formations.

Certain obvious variations from the particular embodiment disclosed may be made. These includes the elimination of the reciprocating means so that conductivity rather than resistivity can be plotted against depth, the positioning some or all of the various electronic circuits within cartridge 19 (including the reciprocators) at the surface of the earth rather than within the tool, the use of different means for providing a reference voltage and of different means for comparing the reference and signal voltages, the use of two separate single pen recorders rather than dual pen recorder 25 and, of course, the use of different coil spacings and different numbers of coil turns in order to achieve different depths of investigation. In addition, while the use of alternating current voltage in the transmitter coils is the most reliable way to induce current in the formation, it will be understood that other forms of time-dependent voltage, including non-sinusoidal pulses, may perform this function. All of these and other variations obvious to those skilled in the art are intended to be within the scope of the invention as defined by the following claims.

I claim:
1. An induction logging apparatus comprising:
a mandrel adapted to be lowered into a borehole;
a pair of coaxial transmitter coils longitudinally spaced along said mandrel, producing two unequal opposing fields;
a receiver coil on said mandrel, longitudinally spaced from said transmitter coils and not between said transmitter coils, forming with said transmitter coils a first substantially mutually balanced coil system;
a second receiver coil on said mandrel, longitudinally spaced between said transmitter coils, forming with said transmitter coils a second substantially mutually balanced coil system;
first circuit means including a source of alternating current connected to said transmitter coils in such a manner as to energize them oppositely;
second circuit means connected to the first receiver coil, said circuit means including a phase detector;
third circuit means connected to the second receiver coil, said circuit means including a phase detector;
an auxiliary coil on said mandrel, said auxiliary coil inductively coupled closely to one of the transmitter coils;
a phase shift network connected to the auxiliary coil and second and third circuit means receiving the output of the auxiliary coil and developing it as a reference signal for the phase detectors.

2. Apparatus for induction logging of earth well boreholes and the like comprising:
a pair of transmitter coils producing two unequal opposing fields adapted to be lowered into a borehole in fixed, longitudinally spaced apart relation with respect to one another;
a first receiver coil adapted to be lowered into a borehole in fixed, longitudinally spaced apart relation with respect to said transmitter coils but not between said transmitter coils and forming a first substantially mutually balanced system therewith;
first circuit means producing time-dependent voltages to energize said transmitter coils oppositely;
second circuit means connected to said first receiver coil including means for deriving a direct current proportional to the voltage induced in said first receiver coil;
a second receiver coil adapted to be lowered into a borehole in fixed, longitudinally spaced apart relation with respect to said transmitter coils between the said two transmitter coils and forming a second substantially mutually balanced system therewith;
third circuit means, independent of said second circuit means connected to said second receiver coil including means for deriving a direct current proportional to the voltage induced in said second receiver coil;
a phase detector connected to each of the second and third circuit means, and
means for deriving a phase reference voltage from the circuit energizing the transmitter coils, the reference voltage being fed to said phase detectors.

3. Apparatus for induction logging of earth well boreholes and the like comprising:
a first transmitter coil having a number of turns $T_{21}$;
a second transmitter coil having a number of turns $T_{23}$ and longitudinally spaced distance $d_1$ from said first transmitter coil;
circuit means including a common source of alternating circuit voltage so connected to said transmitter coils as to energize them oppositely;
a first receiver coil longitudinally spaced a distance $d_2$ which is greater than $d_1$ from said second transmitter coil measured in the direction toward first transmitter coil;
a second receiver coil longitudinally spaced a distance X which is less than $d_1$ from said second transmitter coil measured in the direction toward said first transmitter coil, coils being on a common axis and all distances being measured with respect to the longitudinal center of each coil;
wherein the relations $$\frac{T_{23}}{d_2^3} = \frac{T_{21}}{(d_2-d_1)^3}$$

and $$\frac{T_{23}}{X^3} = \frac{T_{21}}{(d_1-X)^3}$$

are both substantially satisfied; and
independent means connected to each of the receiver coils to derive a direct current proportional to a selected component of the voltage induced in each receiver coil.

References Cited by the Examiner

UNITED STATES PATENTS 2,220,070    11/1940    Aiken    324—6
2,438,197    3/1948    Wheeler    324—3 X (Other references on following page)

UNITED STATES PATENTS

| | | | |
|---|---|---|---|
| 2,451,596 | 10/1948 | Wheeler | 324—3 |
| 2,582,314 | 1/1952 | Doll | 324—6 |
| 2,582,315 | 1/1952 | Doll | 324—6 |
| 2,790,138 | 4/1957 | Poupon | 324—6 |
| 3,051,892 | 8/1962 | Huston | 324—6 |
| 3,052,835 | 9/1962 | Dunlap et al. | 324—6 X |
| 3,065,407 | 11/1962 | Huddleston et al. | 324—6 |
| 3,067,382 | 12/1962 | Schuster | 324—6 |
| 3,086,168 | 4/1963 | Buckner | 324—6 |
| 3,105,190 | 9/1963 | Norris | 324—6 |
| 3,108,220 | 10/1963 | Ruddock | 324—4 X |
| 3,112,443 | 11/1963 | Buckner | 324—6 |
| 3,181,057 | 4/1965 | Bravenec | 324—6 X |

WALTER L. CARLSON, *Primary Examiner.*

G. R. STRECKER, *Assistant Examiner.*